United States Patent Office 3,209,237
Patented Sept. 28, 1965

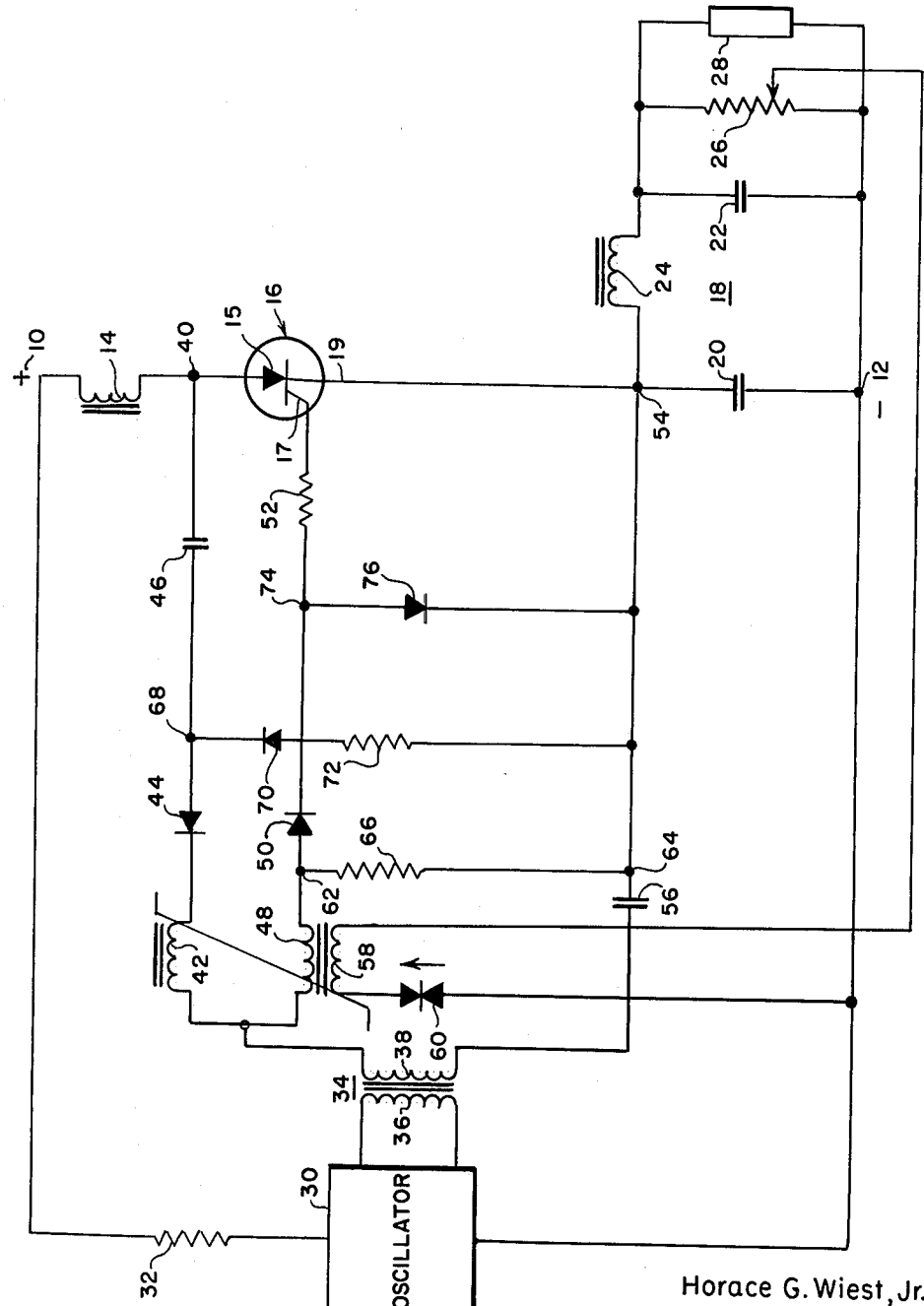
Horace G. Wiest, Jr.
INVENTOR.
BY Isidore Match
ATTORNEY

3,209,237
REGULATED D.C. TO D.C. CONVERTER EMPLOY-
ING SATURABLE REACTOR CONTROL MEANS
FOR A SINGLE SILICON CONTROLLED RECTI-
FIER
Horace G. Wiest, Jr., Lynchburg, Va., assignor to General
Electric Company, a corporation of New York
Filed May 5, 1960, Ser. No. 27,011
5 Claims. (Cl. 323—22)

This invention relates to regulated voltage supply circuits. More particularly, it relates to a circuit for providing a regulated relatively low unidirectional potential output from a relatively high unidirectional potential source.

In some electrical systems, operation must be had from a most reliable source of power, such most reliable source preferably being a battery. An example of such a system is carrier-current equipment which, since it is part of a protective system has to be operated on a power station battery, the latter battery being of the type which is generally rated at either 125 or 250 volts. In the situation where carrier current equipment is transistorized, there is required a 48 volt direct current voltage supply.

Heretofore, to operate a 48 volt load from a 125 or 250 volt battery, there generally have been employed voltage dropping resistors. The use of the latter has resulted not only in poor efficiency of operation but has resulted also in the production of an output voltage which varies considerably with both the condition of the load and the condition of the battery. For example, a power station battery rated at 250 volts may actually run as low as 200 volts when it is placed under heavy demand such as after an A.C. power failure and may actually run as high as 280 volts during an "equalize charge."

The term "equalize charge" refers to the care and feeding of storage batteries consisting of many cells in series. Since all the cells in the battery will not have exactly the same leakage, after an extended period of trickle charging, the cell voltages will become unequal. Thus, periodically, a high charging rate is used which brings the cells up to full voltage. The best cells will reach this voltage first, after which their voltage will not increase further. The electrolyte will start to decompose, a phenomenon referred to as "gassing." Meanwhile, the poorer cells are gradually building up voltage until, finally, all cells are "gassing" and have reached the fully charged state.

Such "equalize charge" operation may occur as often as once a month. It has been found that the efficiency of a system providing 49 volts from a 250 volt battery is only about 19 percent, and the output voltage variation under conditions as set forth hereinabove may be as much as from 38.4 to 53.7 volts with a constant load. Load variations will, of course, cause an even wider swing in the output load voltage.

Because of the high voltage of power-station batteries, obviously transistors cannot be employed as circuits to convert this voltage to a 48 volt value. Converter circuits employing silicon controlled rectifiers might be used for this purpose but they are undesirable because of the number of such devices which would be required (two to four at a cost of approximately $100 each). Another undesirable feature characteristic of such converter circuits is that they transfer power from D.C. to A.C. and then, by rectification, back to D.C. again. Thus, there is effectively required equipment which handles three watts of power for every watt of output that it produces.

In converter circuits of the type using dropping resistors to provide a relatively low voltage D.C. supply from a high voltage source, a power transformer and a circuit consisting of a great multiplicity of components is generally required which further increases the expense and inefficiency of such circuits. In addition, the voltage regulating means may be relatively complex if such means is employed.

Accordingly, it is an important object of this invention to provide an improved D.C. to D.C. converter circuit which provides a relatively constant substantially smaller D.C. voltage output from a D.C. source.

It is a further object to provide a circuit in accordance with the preceding object wherein no power transformer is required and wherein the circuit employs a minimum of components whereby there results high efficiency as well as low cost.

It is another object in accordance with the preceding objects to provide a circuit wherein only one silicon controlled rectifier is used instead of from two to four, thus affecting a substantial saving from similar circuits which utilize a plurality of such devices, the silicon controlled rectifier in this circuit never having more than the battery voltage impressed upon it in either direction.

It is still another object to provide a circuit in accordance with the preceding objects wherein simple voltage regulating means is included.

Generally speaking, and in accordance with the invention there is provided in combination, a unidirectional potential source, an alternating current potential source, a load, and means in circuit with the unidirectional potential source which is rendered conductive in response to the application thereto of a positive voltage and is rendered non-conductive from its conductive state in response to the application thereto of negative voltage. Means are provided in circuit with the unidirectional potential source and the alternating current potential source for controlling the application of voltage from the alternating current potential source to the last named means. Means are further provided for feeding back a portion of the voltage developed across the load and means are included which is responsive to the feedback voltage to influence the action of the controlling means whereby a relatively constant regulated voltage is maintained across the load.

The features of this invention which are believed to be new are set forth with particularity in the appended claims. The invention itself, may be best understood by reference to the following description when taken in conjunction with the accompanying drawing which discloses an embodiment of a circuit according to the invention.

In the drawing, there is shown a schematic diagram of an embodiment of the invention utilizing a silicon controlled rectifier.

Referring now to the drawing, the high voltage battery (not shown), from which it is desired to derive the chosen lower value of unidirectional potential is connected in the circuit between the positive terminal 10 and the negative terminal 12. Connected in series arrangement between terminals 10 and 12, as shown, is a current limiting inductor 14, the anode to cathode path of a silicon controlled rectifier 16 and a pi filter 18 comprising parallel connected capacitors 20 and 22 respectively and a series connected inductor 24. Connected in shunt with filter 18 is a bleeder resistor 26. The desired output voltage is developed across load 28.

An oscillator 30 which may suitably have an output frequency of 400 c.p.s. receives its B+ voltage supply from terminal 10 through a resistor 32 and its B— voltage supply from terminal 12. Provided at the output of oscillator 30 is a transformer 34, comprising a primary winding 36 and a secondary winding 38. The upper terminal of secondary winding 38 is connected to the junction 40 of inductor 14 and the anode 15 of silicon controlled rectifier 16 through the series arrangement of a self-saturating magnetic amplifier power coil 42, the cathode to anode path of a semi-conductor diode 44 being poled in the forward direction of current flow with respect to terminal 10 and a blocking capacitor 46. The upper terminal of secondary winding 38 is also connected to the gate electrode 17 of silicon controlled rectifier 16 through the series arrangement of a self-saturating magnetic amplifier power coil 48, the anode to cathode path of a semiconductor diode 50 poled in the forward direction of current flow with respect to positive potential appearing at the upper end of secondary winding 38 and a current limiting resistor 52.

The lower terminal of secondary winding 38 is connected to the junction 54 of the cathode 19 of silicon controlled rectifier 16 and the high side of capacitor 20 through a capacitor 56.

For feeding back a portion of the voltage developed across bleeder resistor 26, there is provided a tap thereon which is connected to negative terminal 12 through the self-saturating magnetic amplifier control coil 58 and a Zener diode 60, Zener diode 60 being poled in the forward direction of current flow with respect to terminal 12, as shown by the direction of the arrow. Coils 58, 48, and 42 together comprise a self-saturating magnetic amplifier of the type known as an amplistat.

Connected between the junction 62 of coil 48 and diode 50, and the junction 64 of capacitor 56 and inductor 24 is a reset resistor 66. Connected between the junction 68 of diode 44 and capacitor 46 and junction 64 is a series arrangement of the cathode to anode path of a diode 70 and a current limiting resistor 72. Connected between the junction 74 of diode 50 and resistor 52 and junction 64 is the anode to cathode path of a switching diode 76.

Prior to explaining the operation of the described circuit, there are first provided explanations hereinbelow of the operation of the silicon controlled rectifier, the amplistat and the Zener diode.

The silicon controlled rectifier is a PNPN semiconductor device consisting of three rectifying junctions with three terminals, viz., anode 15, cathode 19, and gate 17. With reverse voltage impressed on the device, i.e., cathode positive, the silicon controlled rectifier blocks the flow of current. With positive voltage applied to the anode, it also blocks the flow of current up to a breakover point, $V_{BO}$. At this point, the blocking resistance of the silicon controlled rectifier decreases almost instantaneously to a very low value and current flow through the device is then limited only by the external voltage and circuit impedance. At anode to cathode voltages of less than $V_{BO}$, the rectifier can be switched into the high-conduction state by a low-level gate-to-cathode current. The latter phenomenon is usually referred to as the "turning on" of the controlled rectifier. The controlled rectifier can be "turned off" by reducing the flow of anode current through less than a chosen "holding value," $I_H$. This can be accomplished by reducing the supply voltage to zero as occurs in every cycle in A.C. circuits or by diverting anode current around the rectifier for the few microseconds required for the device to recover its blocking state.

To understand the action of the amplistat comprising coils 58, 48, and 42, it is first to be realized that the core material thereof is preferably grain oriented. With such core material, provided that there is no air gap, a relatively small amount of direct current flowing in the control coil causes the core to saturate. Since winding open-circuit reactance usually is much greater than winding direct current resistance, once the core saturates, effectively, the only impedance presented by the winding is its small winding resistance. Since only a relatively small amount of direct current flowing in the winding causes the core to saturate, the reactance thereof may be varied by a small amount of D.C. power. Thus, if one winding of a transformer is connected between an A.C. supply and a load, the amount of power delivered to the load may be controlled by a small amount of D.C. power flowing in another winding.

As seen in the drawing, during positive half cycles of the output of oscillator 30 current flows through coil 48 because diode 50 is properly poled to permit current flow. Similarly during negative half cycles of the output of oscillator 30 current flows through coil 42 because diode 44 is properly poled to permit current flow. Direct current flows through winding 58 from bleeder resistor 26 to terminal 12 through Zener diode 60.

When the reverse voltage across diode 60 exceeds its Zener breakdown voltage where half cycles of sinusoidal current waves flow through the power coils, viz., through coils 48 and 42, an initial portion of the current wave provides the exciting current, i.e., the current necessary to saturate the core. Thereafter, an output current is provided through the coil which follows the remainder of the sinusoidal waveform. This can be understood if it is realized that the exciting current is necessary to orient the magnetic domains in the core in a given direction. When the direction of current through the core is reversed, the exciting current is necessary to switch the orientation of the magnetic domains in the core in the opposite direction. That portion of current between the zero angle of the half cycle of sinusoidal current wave and the point at which a current supply is obtained through a power coil may be referred to as the "firing" angle. In the event, that a complete half cycle does not quite switch all the domains in the core, i.e., saturate the core, so that its reactance remains appreciably high, a coil may be described as failing to "fire."

A Zener diode is a semiconductor rectifying element which passes very little reverse current until its critical voltage is exceeded. Thereafter, it provides a substantially constant voltage region. Such diode therefore is characterized by substantial increases in current with slight increases in voltage above the predetermined critical voltage. This type of diode undergoes the phenomenon known as a "Zener" breakdown in which it is believed that the electric field in the PN barrier region of the diode is sufficiently high to cause a sort of "field emission" across the energy gap, thus increasing the number of carriers in the barrier region by a large amount. This type of breakdown is reversible and does not lead to the disruption or damage of the diode unless the power dissipated in the high current region of the breakdown characteristic is sufficient to burn out the unit.

Considering now the operation of the described circuit, when silicon controlled rectifier 16 is not conducting and the voltage output of oscillator 30 is passing through the zero-cross over point, capacitor 46 charges approximately to the difference between the battery voltage and the load voltage. During a positive half cycle, as the upper terminal of secondary winding 38 becomes positive, coil 48 of the amplistat requires an initial portion of this voltage to provide exciting current for its saturation. Upon its saturation, i.e., the attaining of its firing point, part of the current flowing therethrough charges capacitor 56 through diode 50 and diode 76 and part of this current flows through current limiting resistor 52 and gate electrode 17 of silicon controlled rectifier 16. The point at which coil 48 saturates is determined by the voltage applied from the upper terminal of secondary winding 38, the feedback current in coil 58 and the state of the core of coil 48 which is determined in part by resistor 66. In this latter connection, if the orienting of the magnetic domains in the core of the coil 48 is such as to permit positive current to flow through winding 48, this may be designated as "setting" the core and current flowing in the opposite direction may be described as "resetting" the core. Thus, during a half cycle of negative voltage at the output of oscillator 30, some current will flow through resistor 66 and coil 48 in the resetting direction to partially reset coil 48. With regard to current flowing through coil 58, it is seen that such current will not flow therethrough until the Zener breakdown voltage is attained at the cathode of diode 60. Once such breakdown voltage is attained and exceeded, the current through coil 58 will be in the direction to cause the resetting of coils 48 and 42 whereby the firing angles of coils 48 and 42 are progressively increased.

When the portion of the positive voltage is applied to gate electrode 17 during a positive half cycle of output from oscillator 30, silicon controlled rectifier 16 is rendered conductive and a pulse of current, limited by inductor 14, passes into capacitor 20 and thence through the remainder of the pi filter comprising inductor 24 and capacitor 22 to the load 28. Simultaneously, capacitor 46 discharges through rectifier 16, limiting resistor 72 and switching diode 70. During this positive half cycle, capacitor 56 charges up to substantially the secondary peak voltage of the transformer which may suitably be about 10 volts.

In the next succeeding negative half cycle from the upper terminal of secondary winding 38, coil 42 conducts due to the presence of diode 44, it firing at a point determined by the voltage applied thereto, i.e., the charge on capacitor 56 plus the voltage from secondary winding 38, the feedback current in coil 58 and the setting of the core of coil 42. The firing of coil 42 causes a pulse of current to flow through silicon controlled rectifier 16 in the reverse direction. This cycle of events is then repeated for every full cycle of output from oscillator 30.

As explaned hereinabove, the presence of resistor 66 causes coil 48 to be reset further than coil 42, i.e., its firing angle becomes progressively greater than that of coil 42. As the voltage across the load builds up due to the pulses of current passed by silicon controlled rectifier 16 into capacitor 20, the fraction of load voltage tapped off at bleeder resistor 26 becomes progressively greater. Eventually, this fraction attains the Zener breakdown voltage of diode 60 whereby current flows in coil 58 and the current thereafter builds up rapidly in coil 58. Thus, the respective firing angles of both coils 48 and 42 are increased. Due to the presence of shunting resistor 66 coil 48 attains a firing angle of 180° prior to coil 42 and thereafter the positive half cycles from oscillator 30 supply only exciting current for coil 48 and the coil does not saturate. Coil 42, however, is still able to fire at some point of the negative half cycle from oscillator 30. This chain of events maintains silicon controlled rectifier 16 non-conductive for one or more cycles of output from oscillator 30 until the current drain from load 28 reduces the output voltage to the point where the control signal in winding 58 is reduced sufficiently to enable coil 48 to fire. When coil 48 fires again, silicon controlled rectifier 16 is rendered conductive for another pulse. Thus, the amount of current required by load 28 is pulsed through the silicon controlled rectifier at a rate which maintains the voltage developed across the load constant within narrow limits.

The circuit of the drawing may be modified by utilizing a unijunction transistor (double base diode) instead of an amplistat. In such situation the rendering conductive of the unijunction transistor with positive half cycles of voltage from secondary winding 38 would pulse silicon controlled rectifier 16.

While there have been described what are considered to be the preferred embodiments of this invention, it will be obvious to those skilled in the art that various changes and modifications may be made therein without departing from the invention and it is, therefore, aimed in the appended claims to cover all such changes and modifications as fall within the spirit and scope of the invention.

What is claimed as new and desired to be secured by Letters Patent of the United States is:

1. In combination, a controlled rectifier having an anode, a cathode and a gate electrode, a unidirectional potential source having positive and negative terminals, a storage capacitor, means connecting the anode-cathode path of said rectifier and said capacitor in series between said positive and negative terminals, a load adapted to be coupled across said capacitor, an oscillator, a control circuit coupled between said oscillator and said rectifier, said control circuit including a plurality of saturating reactor means coupled to said gate and said anode, means applying positive oscillator output alternations to the saturating means coupled to said gate to render said rectifier conductive a fixed period after initiation of the alternation to charge said capacitor, means applying negative oscillator output alternations to the saturating reactor coupled to the anode to render said rectifier nonconductive a fixed period after initiation of the negative alternation so that said rectifier is conductive for a predetermined interval to establish an output voltage across the load, means for developing a control signal proportional to the output voltage across said load, and means coupling said control voltage to said saturable reactor means for varying the point at which they saturate thereby changing the conductive interval of said rectifier.

2. In combination, a controlled rectifier having an anode and cathode and a gate electrode, a unidirectional potential source having positive and negative terminals, means connecting the anode-cathode path of said rectifier in series between said positive terminal and a load circuit, an oscillator, a control circuit coupled between said oscillator and said rectifier, said control circuit including saturating reactor means coupled to said gate and said anode, means applying positive oscillator output alternations to the saturating means associated with said gate to render said rectifier conductive a fixed time after initiation of the alternation, means applying negative oscillator output alternations to the saturating reactor associated with said anode to render said rectifier nonconductive a fixed time after initiation of the negative alternation so that said rectifier is conductive for a predetermined interval to establish an output voltage across the load, means for developing a control signal proportional to the output voltage across said load, and means coupling said control voltage to said saturable reactor means for varying the point in time at which they saturate thereby changing said conductive interval and including voltage reference means whereby said control signal is impressed on said saturable reactor means only if the output voltage exceeds a given level whereby the reactor coupled to said gate electrode is prevented from saturating at all whenever the load voltage exceeds a further predetermined level thereby disabling said control circuit and preventing application of the output of said oscillator to said rectifier.

3. In combination, a unidirectional potential source, rectifying means in circuit with said source and rendered conductive in response to positive gating current, an oscillator, a self-saturating magnetic amplifier including a control coil and a plurality of power coils, means for applying positive half cycles of the output of said oscillator to said rectifying means through said first coil to supply positive gating current thereto, means for applying negative half cycles of the output of said oscillator to said rectifying means through said second coil, a load, means for developing a voltage across said load in response to the accumulation of current pulses through said rectifying means and means responsive to a load voltage exceeding a chosen voltage for disabling said magnetic amplifier.

4. In combination, a unidirectional potential source, rectifying means in circuit with said source and rendered conductive in response to positive gating current, an oscillator, a self-saturating magnetic amplifier comprising a control coil and first and second power coils to pulse said rectifying means in accordance with the frequency of the output of said oscillator, a load, means for developing a voltage across said load in response to the accumulation of current pulses through said rectifying means, means in circuit with said load and said control coil for providing feedback current through said control coil, and potential reference element connected between the negative terminal of said load and said control coil whereby feedback current flows in said control coil upon the attaining of a load voltage larger than a predetermined reference potential.

5. In combination, a unidirectional potential source, rectifying means in circuit with said source and rendered conductive in response to positive gating current, an oscillator, a self-saturating magnetic amplifier comprising a control coil and first and second power coils, a first rectifier in series arrangement with said first power coil, a second rectifier in series arrangement with said second coil, said first and second coils and said first and second rectifiers being so poled that said coils saturate and supply a first current to said rectifying means during alternate half cycles of output from said oscillator, through said first and second rectifiers, a load, means for developing a voltage across said load in response to the accumulation of current pulses through said rectifying means, means in circuit with said load and said control coil for providing feedback current through said control coil, and a reference voltage element coupled to said control coil to control feedback current in said control coil upon the attaining of a predetermined voltage thereacross to vary the conduction angle of said coils with further changes of load voltage.

References Cited by the Examiner
UNITED STATES PATENTS

| | | | |
|---|---|---|---|
| 2,810,105 | 10/57 | Henrich | 323—22 |
| 2,965,832 | 12/60 | Lode | 323—18 |
| 3,018,432 | 1/62 | Palmer | 323—22 |
| 3,027,508 | 3/62 | Johnson | 321—45 X |
| 3,068,392 | 12/62 | Santelmann | 321—18 |
| 3,074,008 | 1/63 | McPhail | 323—22 |

OTHER REFERENCES

Electronic Design, "Controlled Rectifier Power Supply Is Short-Circuit Protected," November 11, 1959, page 168.

"Controlled Rectifier Manual," published by the Semiconductor Products Department of the General Electric Company, March 1960, pages 66–72.

"General Electric Controlled Rectifier Manual"; March 21, 1960; pages 47, 48 and 122–126.

"Notes on the Application of the Silicon Controlled Rectifier," published by the Semiconductor Products Department of the General Electric Company, December 1958, pages 54–57.

LLOYD McCOLLUM, *Primary Examiner.*

MILTON O. HIRSHFIELD, *Examiner.*